Figure 1:
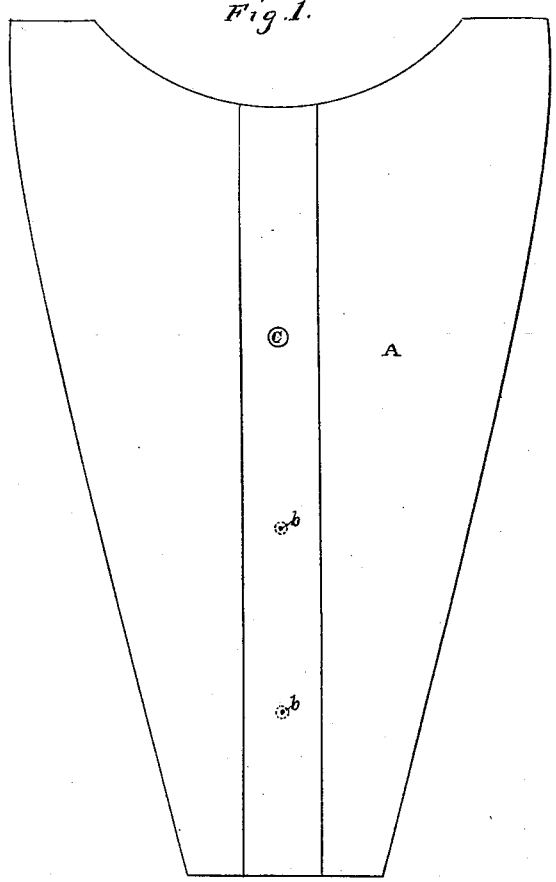
Figure 2:
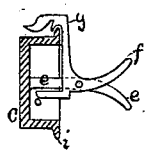
Figure 3:
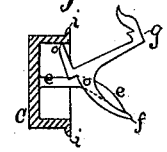

M. ZACHARIAS.
STUD-FASTENING.

No. 191,394. Patented May 29, 1877.

Witnesses
Geo. H. Strong.
Owyn T. Stacy.

Inventor
Marcus Zacharias,
By Dewey & Co.
Att'ys.

UNITED STATES PATENT OFFICE.

MARCUS ZACHARIAS, OF SAN FRANCISCO, CALIFORNIA.

IMPROVEMENT IN STUD-FASTENINGS.

Specification forming part of Letters Patent No. 191,394, dated May 29, 1877; application filed March 30, 1877.

*To all whom it may concern:*

Be it known that I, MARCUS ZACHARIAS, of the city and county of San Francisco, and State of California, have invented an Improved Stud-Fastening; and I do hereby declare the following to be a full, clear, and exact description thereof, reference being had to the accompanying drawings.

My invention relates to an improved device for securing studs and other ornaments to shirt-fronts.

My improved fastening is intended more especially to fasten into minute holes in the shirt-front, such as have heretofore been used in connection with a spiral-wire fastening.

Referring to the accompanying drawings, let A represent a shirt-front, in which a minute hole, b, is made whenever it is desired to attach a stud or other ornament. C represents the stud or other ornament which it is desired to attach to the shirt. A stem, e, projects from the center of the stud on the reverse side, and is bent, as represented, at a slight angle. A crank-shaped lever has its angle pivoted to the stem e, close to the reverse side of the stud, so that one arm, f, will extend outward from the stud, while the other, g, extends outward alongside the stud, as represented.

The arm f is bent in an opposite direction from the stem e, so that when the arm g lies close up against the stud the stem e and arm f will represent a fork, or two diverging prongs; but when the arm g is thrown outward from the stud, the arm f will be brought alongside of the stem e, so that both can be passed through the hole b in the shirt-front. The stud C has a rim or flange, i, formed around its reverse edge, and the outer extremity of the arm g is turned up and notched, so that it will latch upon the flange when it is closed up against the stud. Now, when the arm g is thrown down, so as to cause the arm f and stem e to lie side by side, they can be easily inserted through the hole b in the shirt-front; then, by closing the arm g against the stud until it latches, the arm and stem will be separated, so as to prevent the withdrawal of the stud.

In the present instance the stud is represented as being made hollow, and an arm, O, projects from the bell-crank arm up into the hollow space. This arm serves as a stop to prevent the arm f from passing the stem e when the arm g is thrown outward.

This fastening is very simple and effective, as it can be inserted and fastened without trouble, and without rumpling the shirt-bosom. The prongs or arms f e need not be made very long, as only a small amount of spread is required to prevent them from coming out of the hole.

Having thus described my invention, what I claim, and desire to secure by Letters Patent, is—

1. A stud-fastening, consisting of the bent stem or prong e, in combination with the crank-lever, consisting of the bent arm f and latch-arm g, pivoted as described, and arranged to latch on the flange i on the stud, substantially as above described.

2. The stud C, with its curved stem or prong e, in combination with the pivoted bell-crank lever, consisting of the bent arm f, latch-arm g, and the stop-arm O, substantially as and for the purpose above described.

In witness whereof I have hereunto set my hand and seal.

MARCUS ZACHARIAS. [L. S.]

Witnesses:
 OLWYN T. STACY,
 FRANK A. BROOKS.